(12) United States Patent
Tisch et al.

(10) Patent No.: US 10,205,880 B2
(45) Date of Patent: *Feb. 12, 2019

(54) SELECTION OF MICROPHONES IN A CAMERA

(71) Applicant: GoPro, Inc., San Mateo, CA (US)

(72) Inventors: Erich Tisch, San Francisco, CA (US); Fabrice Barbier, San Carlos, CA (US); Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/784,086

(22) Filed: Oct. 14, 2017

(65) Prior Publication Data

US 2018/0124320 A1 May 3, 2018

Related U.S. Application Data

(63) Continuation of application No. 15/464,342, filed on Mar. 21, 2017, now Pat. No. 9,826,160, which is a continuation of application No. 14/275,696, filed on May 12, 2014, now Pat. No. 9,635,257.

(51) Int. Cl.
  *H04N 5/76*  (2006.01)
  *H04N 5/232* (2006.01)
  (Continued)

(52) U.S. Cl.
  CPC .......... *H04N 5/23258* (2013.01); *G06T 7/20* (2013.01); *H04N 1/2112* (2013.01);
  (Continued)

(58) Field of Classification Search
  CPC .... H04N 19/176; H04N 19/70; H04N 19/174; H04N 19/513; H04N 19/105;
  (Continued)

(56) References Cited

U.S. PATENT DOCUMENTS 1,928,850 A * 10/1933 De La Croix ........... H03G 5/00
                                                 250/208.2
5,266,811 A    11/1993 Matsuura
(Continued)

FOREIGN PATENT DOCUMENTS

WO    2013049248 A2    4/2013

OTHER PUBLICATIONS

Extended European Search Report for European Patent Application No. EP 15793630, dated Jul. 13, 2017, 11 Pages.
(Continued)

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

A camera is configured with multiple microphones to reduce wind noise in audio data collected by the camera. The camera receives motion data, which may comprise data indicating acceleration of the camera, a plurality of video frames received by the camera, or a background level of noise associated with one or more microphones configured on the camera. The camera determines a motion vector from the motion data. The motion vector is parallel to the direction of motion of the camera. The camera selects a subset of one or more microphones in the direction of the motion vector. By recording audio data using the one or more selected microphones, the camera reduces wind noise in the audio data.

20 Claims, 8 Drawing Sheets

(51) Int. Cl.
*H04N 1/21* (2006.01)
*G06T 7/20* (2017.01)
*H04R 3/00* (2006.01)
*H04N 101/00* (2006.01)

(52) U.S. Cl.
CPC ......... H04N 5/23254 (2013.01); H04R 3/005 (2013.01); *H04N 2101/00* (2013.01); *H04N 2201/3264* (2013.01); *H04N 2201/3277* (2013.01); *H04R 2410/07* (2013.01); *H04R 2499/11* (2013.01)

(58) Field of Classification Search
CPC .... H04N 19/159; H04N 19/182; H04N 19/86; H04N 19/593; H04N 19/119; H04N 19/50; H04N 19/109; H04N 19/57; H04N 19/573; H04N 5/23258; H04N 5/23254; H04N 1/2112; H04N 2101/00; H04N 2201/3277; H04N 2201/3264; H04R 3/005; H04R 2499/11; H04R 2410/07; G06T 7/20
See application file for complete search history.

(56) References Cited

U.S. PATENT DOCUMENTS

| | | | |
|---|---|---|---|
| 5,430,480 A | 7/1995 | Allen | |
| 6,243,138 B1 | 6/2001 | Keirsbilck | |
| 6,754,373 B1 | 6/2004 | De | |
| 8,150,063 B2 | 4/2012 | Chen | |
| 8,150,248 B1 * | 4/2012 | Woodman | B63B 25/002 396/25 |
| 8,401,178 B2 * | 3/2013 | Chen | G10L 21/0208 379/406.02 |
| 9,635,257 B2 * | 4/2017 | Tisch | H04R 3/005 |
| 9,826,160 B2 * | 11/2017 | Tisch | H04R 3/005 |
| 2005/0135482 A1 | 6/2005 | Nair | |
| 2007/0009127 A1 | 1/2007 | Klemenz | |
| 2009/0110076 A1 | 4/2009 | Chen | |
| 2009/0129620 A1 | 5/2009 | Tagawa | |
| 2009/0154896 A1 | 6/2009 | Matono | |
| 2009/0190769 A1 | 7/2009 | Wang | |
| 2014/0112502 A1 | 4/2014 | Lee | |
| 2014/0211086 A1 | 7/2014 | Wharton | |
| 2014/0267808 A1 * | 9/2014 | Kuwata | H04N 19/56 348/208.6 |

OTHER PUBLICATIONS

Supplementary Partial European Search Report for European Patent Application No. EP 15793630, dated Apr. 10, 2017, 8 Pages.
PCT International Search Report and Written Opinion for PCT/US2015/028347, dated Aug. 4, 2015, 13 Pages.
United States Office Action, U.S. Appl. No. 14/275,696, dated Aug. 18, 2016, 19 pages.
United States Office Action, U.S. Appl. No. 14/275,696, dated May 27, 2016, 19 pages.
United States Office Action, U.S. Appl. No. 14/275,696, dated Dec. 3, 2015, 19 pages.

* cited by examiner

SELECTION OF MICROPHONES IN A CAMERA

CROSS REFERENCE TO RELATED APPLICATIONS

This application is a continuation of U.S. application Ser. No. 15/464,342, filed Mar. 21, 2017, now U.S. Pat. No. 9,826,160, which is a continuation of U.S. application Ser. No. 14/275,696, filed May 12, 2014, now U.S. Pat. No. 9,635,257, which is incorporated by reference in its entirety.

BACKGROUND

Technical Field

This disclosure relates to a camera system, and more specifically, to controlling multiple microphones during camera operation.

Description of the Related Art

Digital cameras are increasingly used in outdoors and sports environments, particularly while a user, a user's equipment, or a user's vehicle is in motion. Such use can result in increased wind noise captured by a microphone. Wind noise is generally proportional to camera speed or wind speed, and can increase or decrease based on the orientation of the camera relative to the wind direction. Wind noise is detrimental to video playback, as it obscures or otherwise interferes with the audio portion of the captured video. Accordingly, the reduction of wind noise can improve the quality of captured video and improve a camera user's overall experience.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
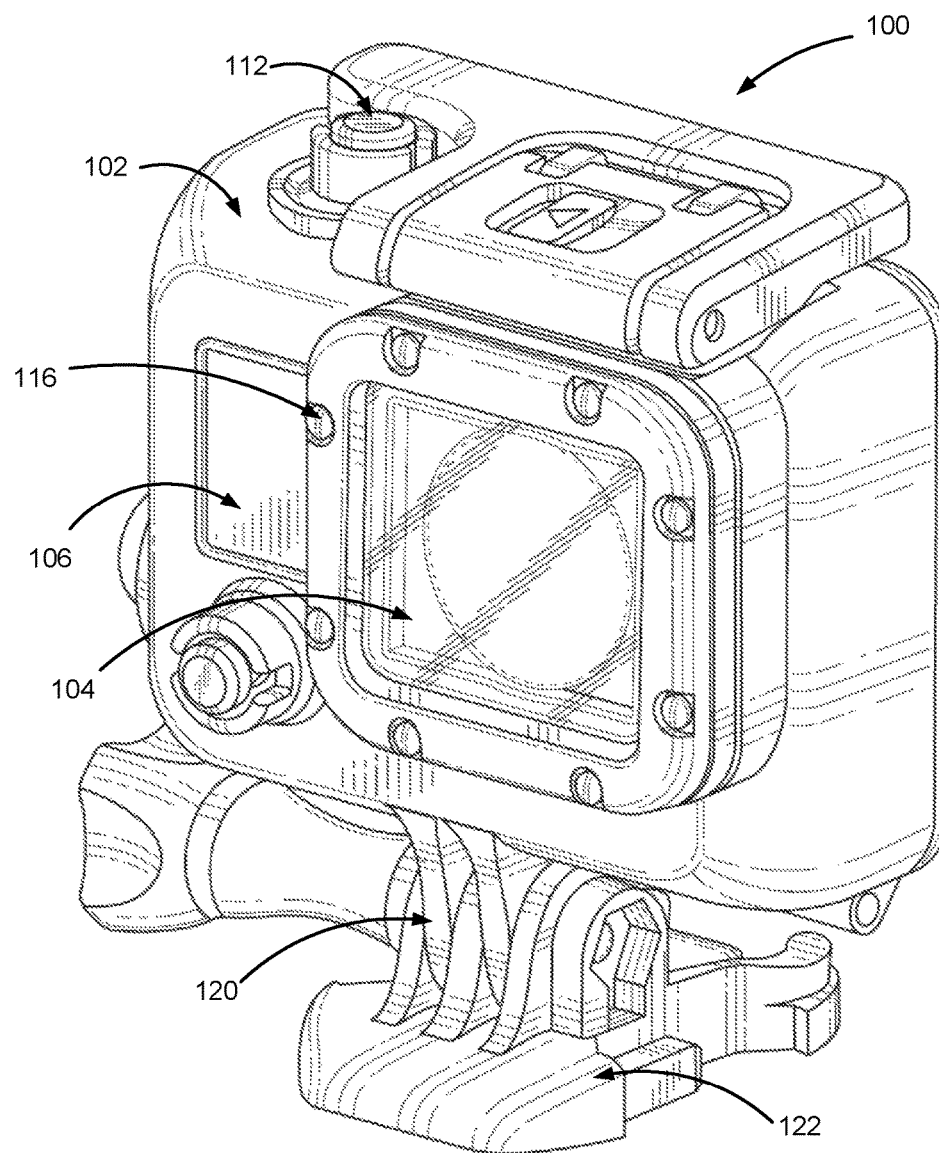
FIG. 1a illustrates a perspective view of a camera system, according to one embodiment.
Figure 1B:
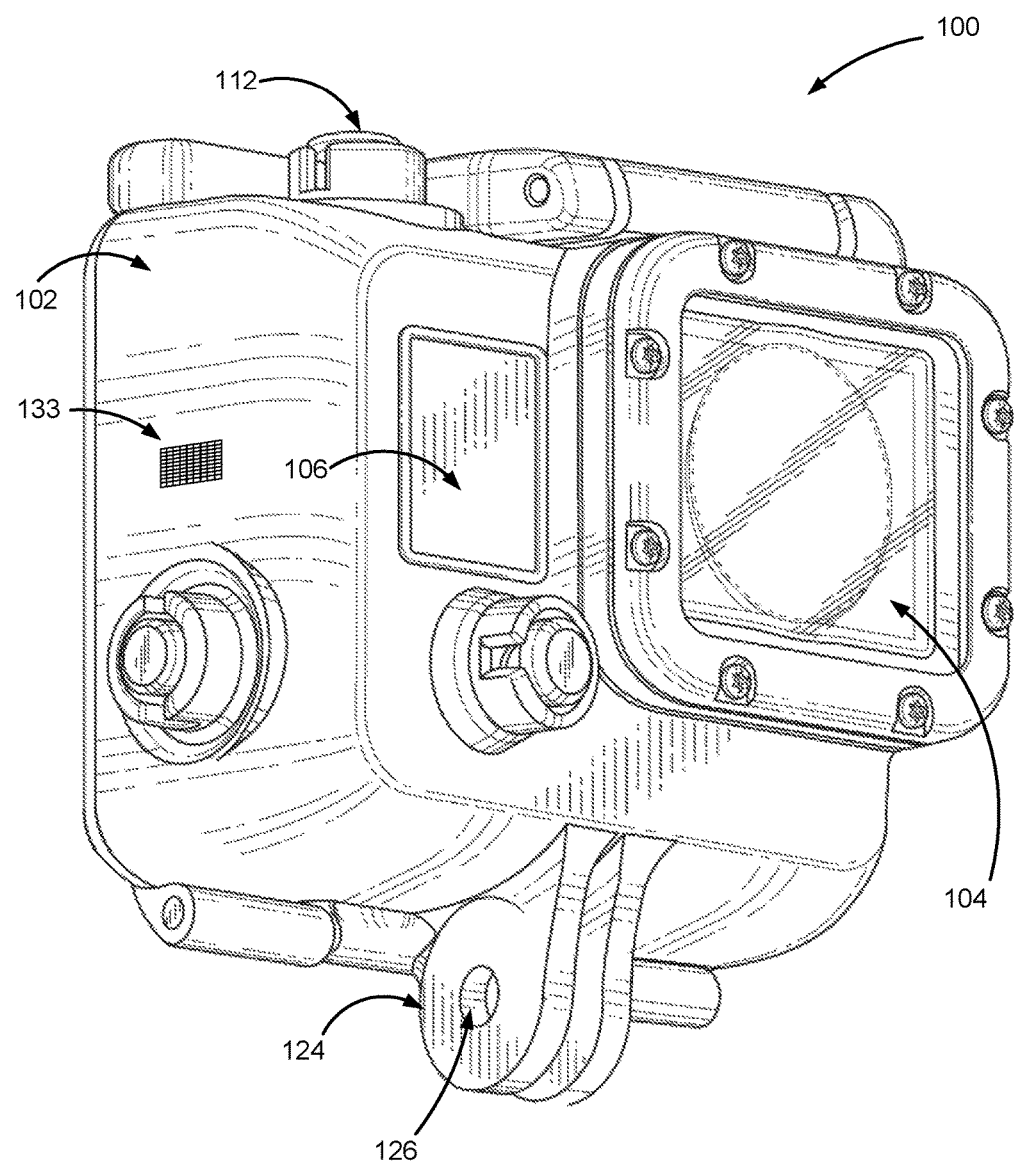
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more microphone ports 133. The microphone ports 133 are structured to substantially align with one or more microphones configured on the camera when the camera is secured within the camera housing 100. The microphone port 133 provides a path for sound to travel from the outside of the camera housing 100 to a microphone on the camera. In one embodiment, the microphone port 133 is an opening that exposes the microphone to the outside environment. In one embodiment, the microphone port 133 features a waterproof cover that protects the microphone from water or dust. While the microphone ports 133 are located on the sides of the camera housing 100 in the illustrated embodiment, the microphone ports 133 can alternatively be located on any surface of the camera housing 100 to substantially align with the microphones, such as the front and the back of the camera housing (for instance, in embodiments in which the microphones are located on the front and back of the camera). In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
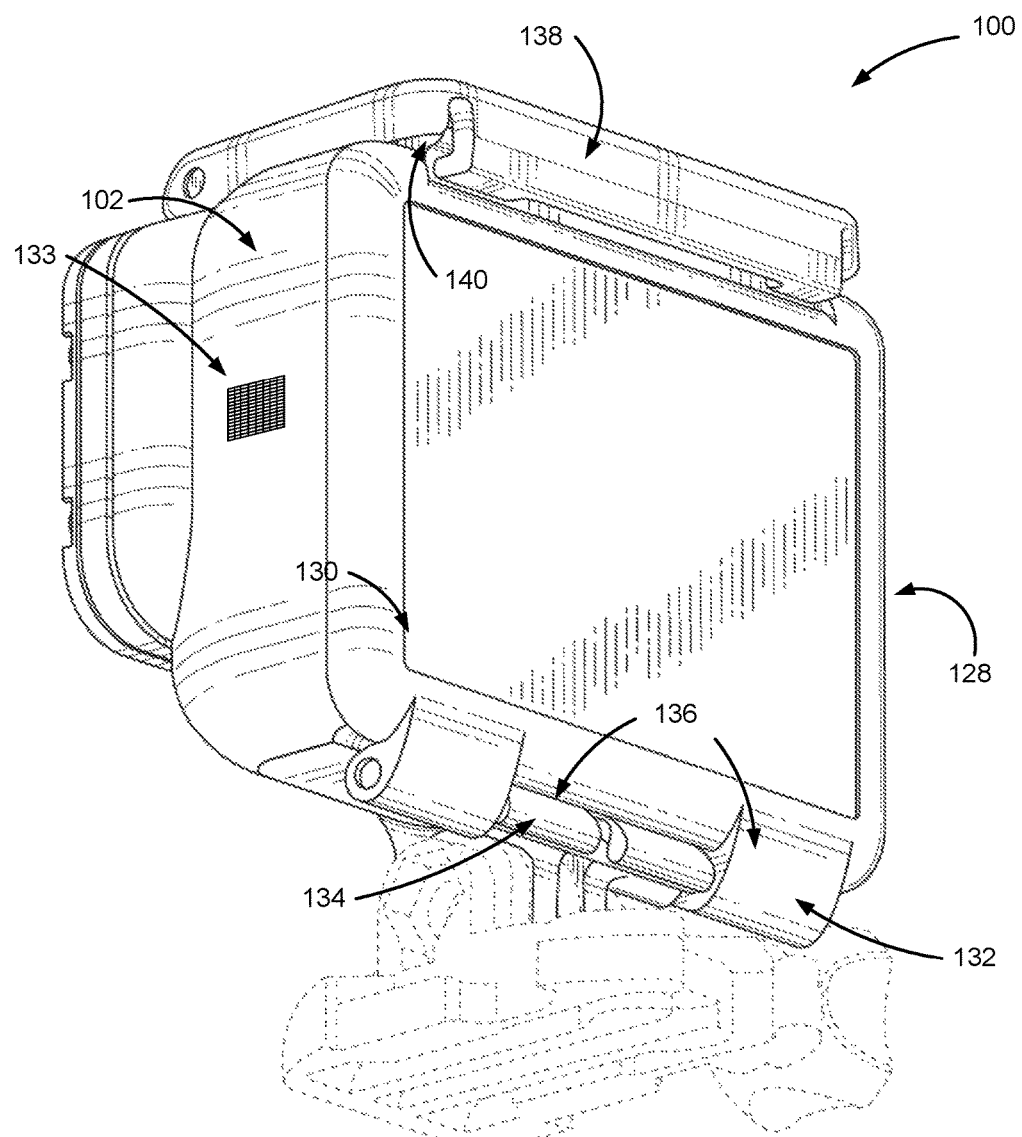
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion 102. The first housing portion 102 and second housing portion 128 are collectively structured to enclose a camera within the cavity when the second housing portion 128 is secured to the first housing portion 102 in a closed position.

In one embodiment, the second housing portion 128 comprises a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 1b. In one embodiment, the fastening structure 138 comprises a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
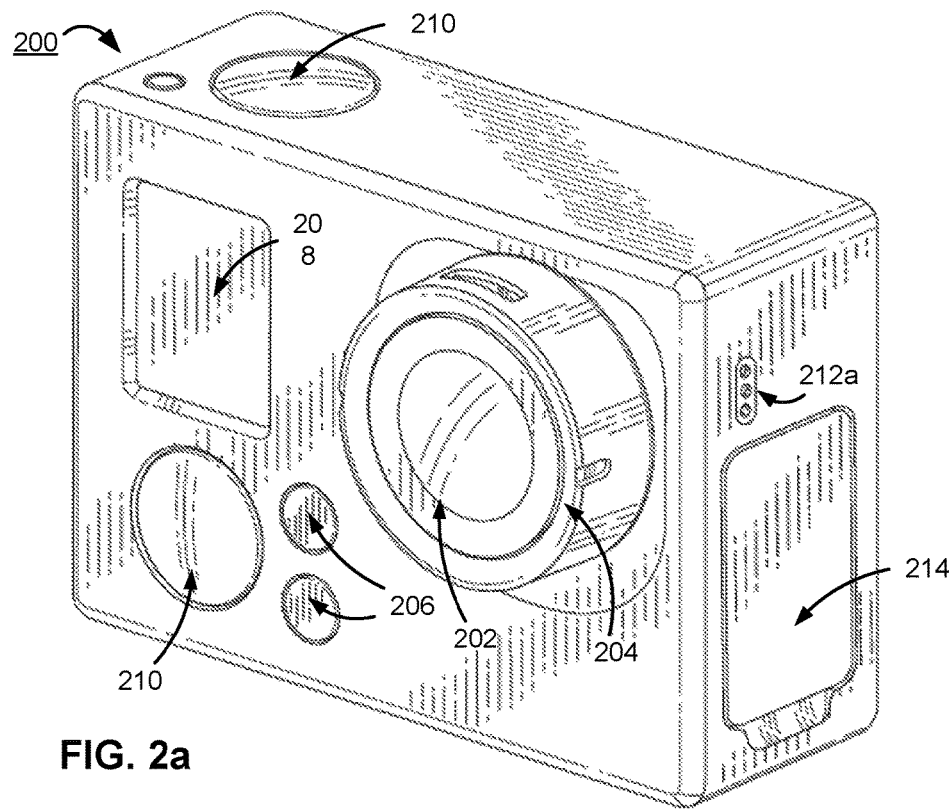
FIG. 2a illustrates a first perspective view of a front of a camera for use with the camera system, according to one embodiment.
Figure 2B:
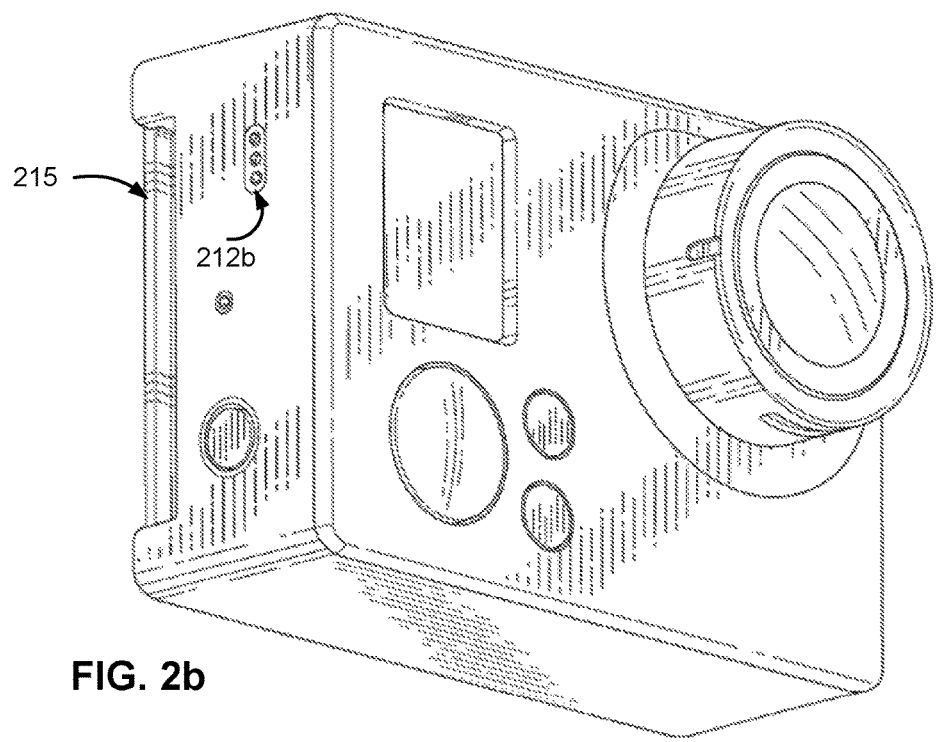
FIG. 2b illustrates a second perspective view of a front of a camera for use with the camera system, according to one embodiment.

FIG. 2a illustrates a first perspective view of a front of a camera 200 for use with the camera system, according to one embodiment. FIG. 2b illustrates a second perspective view of a front of a camera for use with the camera system, according to one embodiment. The camera 200 is configured to capture images and video, and to store captured images and video for subsequent display or playback. The camera 200 is adapted to fit within a camera housing, such as the housing 100 discussed above or any other suitable housing. As illustrated, the camera 200 includes a lens 202 configured to receive light incident upon the lens and to direct received light onto an image sensor 312 internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The buttons 210 may be embodied as a keypad, knobs, dials, individual buttons, switches, or any other conventional user interface.

The camera 200 can also include a first microphone 212a and a second microphone 212b, each configured to receive and record audio signals ("capture audio" hereinafter) in conjunction with recording video. In the illustrated embodiment, the camera 200 includes two microphones 212, but other embodiments of the camera 200 may include additional microphones 212, located on any side/surface of the camera 200. In some embodiments, the first microphone 212a and the second microphone 212b are located on opposite surfaces of the camera 200 (e.g., front-back, left-right, top-bottom, etc.). Locating microphones 212 on opposite surfaces of the camera 200 can ensure that at least one of the two (or more) microphones 212 is always in a favorable location for minimal wind noise. For example, by locating microphones 212 on opposite surfaces of the camera 200, at least one microphone will always be on a camera surface generally facing the direction of motion. The camera surface facing the direction of motion is in a low turbulence region and experiences minimal turbulent pressure fluctuations. Microphones 212 that experience minimal turbulent pressure fluctuations can be subject to less wind noise than microphones 212 that experience more substantial turbulent pressure fluctuations.

The microphones 212 can be configured to capture audio simultaneously. Alternatively, a first microphone can capture audio while a second microphone does not capture audio (for instance, in embodiments where the second microphone is exposed to an above-threshold amount of wind noise). The microphone configured to capture audio can switch based on a change in wind noise, wind direction, camera orientation, or the like). A side of the camera 200 includes an I/O port interface 214. Though the embodiment of FIG. 2a illustrates the I/O port interface 214 enclosed by a protective door, the I/O port interface can include any type or number of I/O ports or mechanisms, such as USB ports, HDMI ports, memory card slots, and the like. A side of the camera 200 also includes a memory card slot 215, configured to receive a removable memory card on which captured images and video can be stored.

Figure 2C:
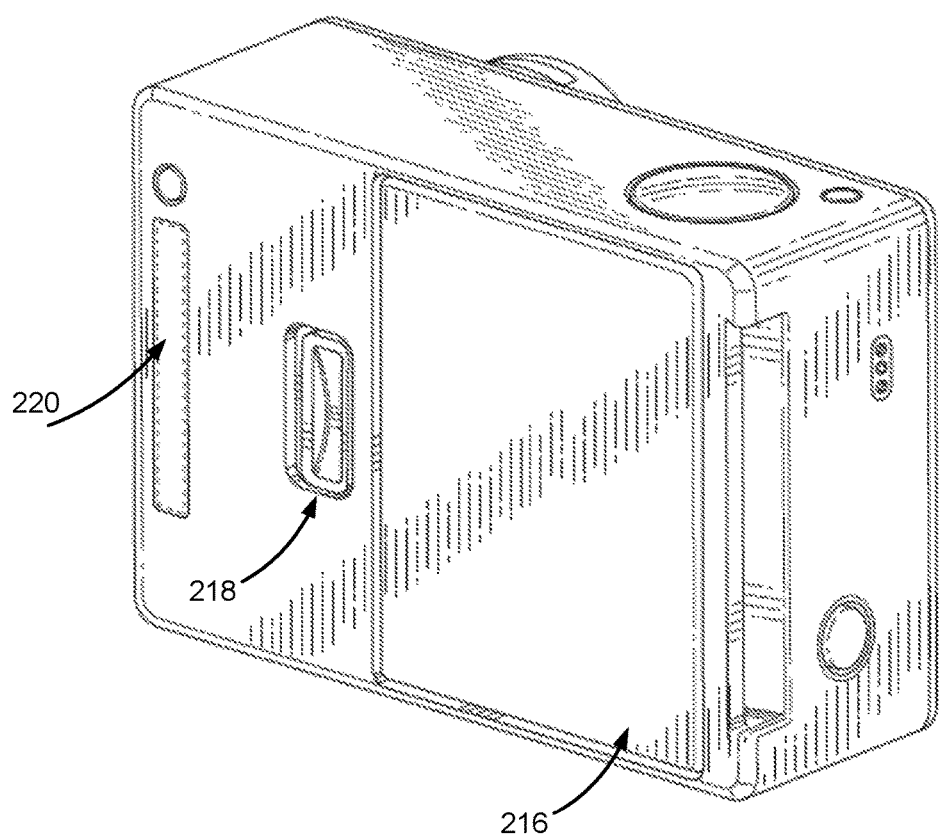
FIG. 2c illustrates a perspective view of a rear of a camera for use with the camera system, according to one embodiment.

FIG. 2c illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Example Camera Configuration

Figure 3:
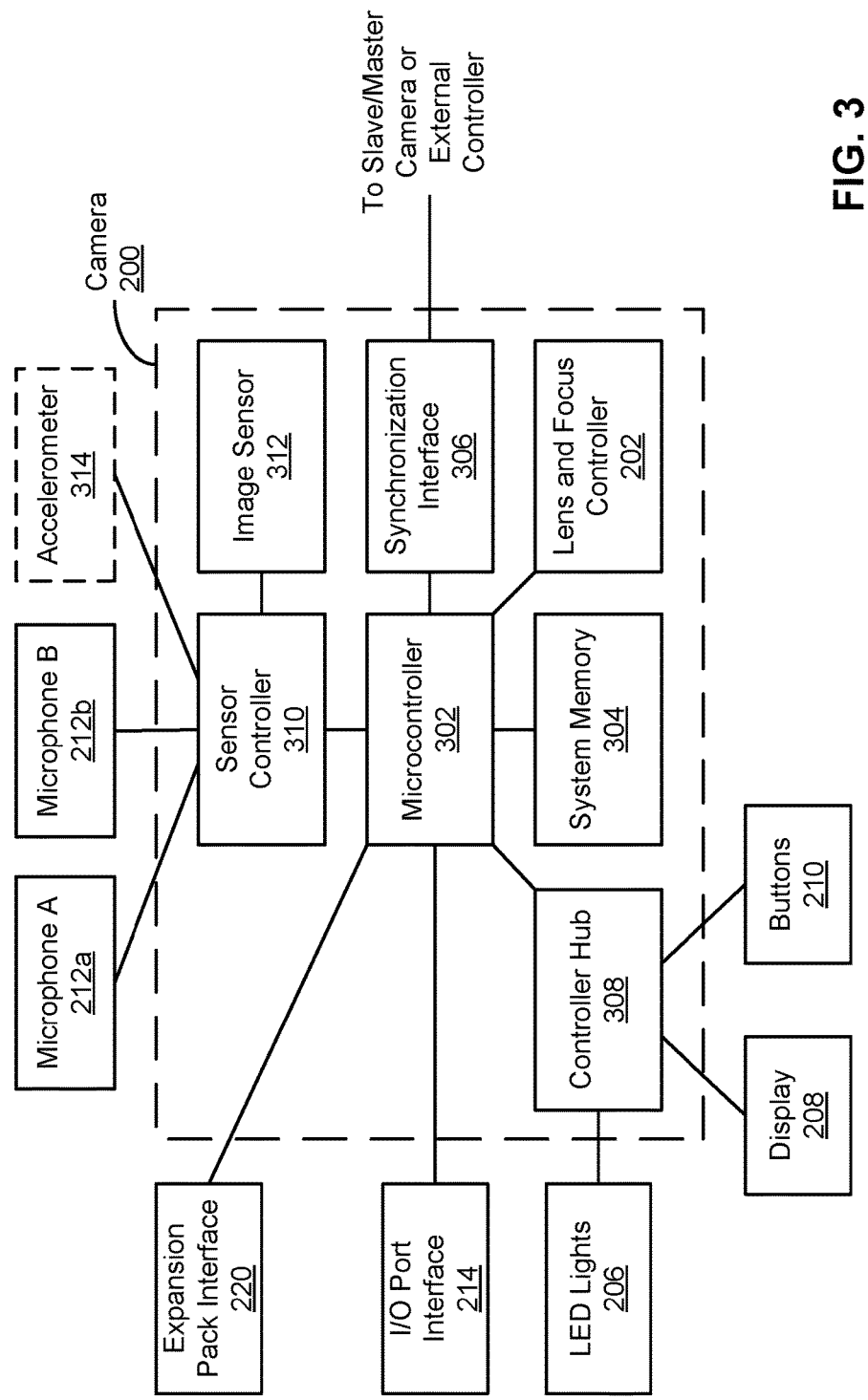
FIG. 3 is a block diagram illustrating electronic components of a camera 300, according to one embodiment.

FIG. 3 is a block diagram illustrating electronic components of a camera 200, according to one embodiment. The camera 200 includes one or more microcontrollers 302 (such as a processor) that control the operation and functionality of the camera 200. A lens and focus controller 302 is configured to control the operation and figuration of the camera lens 202. A system memory 304 is configured to store executable computer instructions that, when executed by the microcontroller 302, perform the camera functionalities described herein. A synchronization interface 306 is configured to synchronize the camera 200 with other cameras or with other external devices, such as a remote control, a second camera 200, or a smartphone.

A controller hub 308 transmits and receives information from user I/O components. In one embodiment, the controller hub 308 interfaces with the LED lights 206, the display 208, and the buttons 210. However, the controller hub 308 can interface with any conventional user I/O component or components. For example, the controller hub 308 may send information to other user I/O components, such as a speaker.

A sensor controller 310 receives image or video input from the image sensor 312. The sensor controller 310 receives audio inputs from one or more microphones, such as microphone 212a and microphone 212b. The sensor controller 310 may receive audio input from one microphone 212 at a time or may receive audio input from multiple microphones 212 simultaneously. Furthermore, the sensor controller 310 can select one or more of the microphones 212 from which the camera 200 receives and records audio inputs. Microphones 212 selected by the controller 310 for receiving and recording audio are referred to herein as "active microphones." Additional sensors, such as an accelerometer 314, may be connected to the sensor controller 310. The accelerometer 314 collects motion data, comprising velocity and/or acceleration vectors representative of motion of the camera 200. The accelerometer 314 may additionally include a gyroscope to provide additional motion data representative of the motion of the camera 200. The accelerometer 314 is rigidly coupled to the camera 200 such that any acceleration experienced by the camera 200 is also experienced by the accelerometer 314.

Additional components connected to the microcontroller 302 include an I/O port interface 214 and an expansion pack interface 220. The I/O port interface 214 may facilitate the camera 200 in receiving or transmitting video or audio information through an I/O port. Examples of I/O ports or interfaces include USB ports, HDMI ports, Ethernet ports, audioports, and the like. Furthermore, embodiments of the I/O port interface 214 may include wireless ports that can accommodate wireless connections. Examples of wireless ports include Bluetooth, Wireless USB, Near Field Communication (NFC), and the like. The expansion pack interface 220 is configured to interface with camera add-ons and removable expansion packs, such as a display module, an extra battery module, a wireless module, and the like.

Example Process for Using a Dual-Microphone Camera

Figure 4:
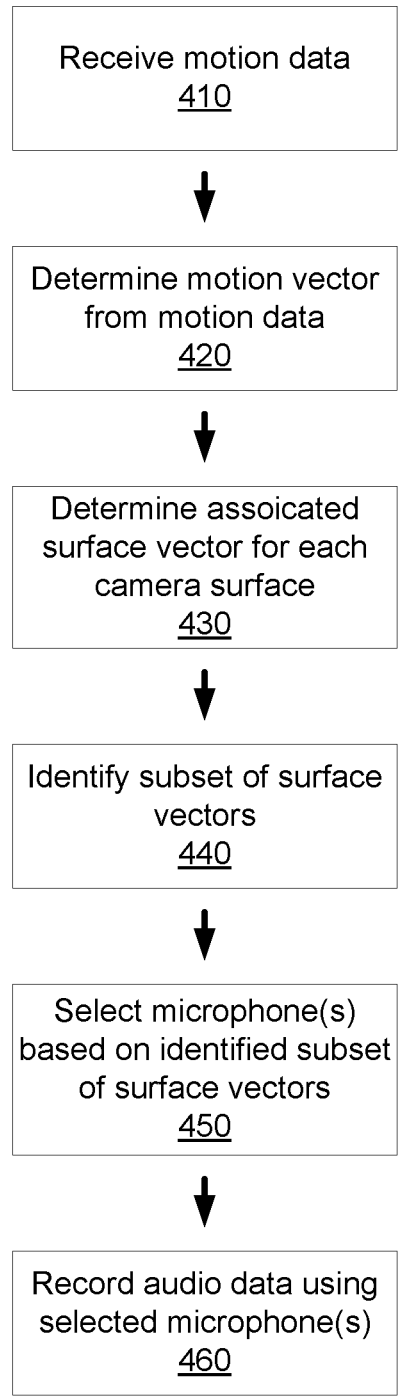
FIG. 4 is a flowchart illustrating a method for selecting a microphone on a dual-microphone camera, according to one embodiment.

FIG. 4 is a flowchart illustrating a method for selecting a microphone on a dual-microphone camera, according to one embodiment. The method is performed by the camera 200. For example, the camera 200 may include a processor 302 that executes instructions, stored on the system memory 304, for performing the disclosed method. The method of FIG. 4 may be performed before the camera 200 receives audio data or in real-time (while the camera 200 is receiving audio data). Additional or alternative steps may be included in other embodiments of the process of FIG. 4.

The camera 200 receives 410 motion data from one or more camera sensors. The motion data includes information representative of the direction of movement of the camera 200. The motion data may also include information regarding the magnitude of the camera's movement. In some embodiments, the motion data includes acceleration data. The acceleration data indicates the acceleration of the camera 200 over a time interval. The time interval may begin when the camera 200 begins recording audio data, may begin before the camera 200 begins recording audio data, or may begin as the camera 200 is recording audio data, for instance, in response to an above-threshold change in detected acceleration. In some embodiments, the motion data additionally or alternatively includes motion estimation data. The motion data includes a plurality of video frames collected by the camera 200 over a time interval, and includes data describing motion of objects within the frames. In some embodiments, the motion data comprises audio data. The audio data includes a background noise level associated with each microphone 212. In some embodiments, the camera 200 receives 410 motion data while the camera 200 is receiving audio or video data. Alternatively, the camera 200 may receive 410 motion data even when the camera 200 is not receiving audio or video data.

In one embodiment, the camera 200 receives 410 motion data from the accelerometer 314 connected to the camera 200. The motion data from the accelerometer 314 indicates the direction and magnitude of acceleration experienced by the accelerometer 314, and thus the camera 200, over a time interval. In the context of this application, acceleration may include translational acceleration, angular acceleration, and rotational acceleration. The accelerometer 314 can measure acceleration in multiple dimensions. The accelerometer 314 may also include one or more gyroscopes. The one or more gyroscopes enable the accelerometer 314 to measure angular acceleration and rotational acceleration.

In one embodiment, the camera 200 receives 410 motion data based on an analysis of a plurality of video frames. In one example embodiment, the plurality of video frames can include video data received or captured by the camera 200. Each frame in the plurality of video frames comprises a plurality of pixels at a particular image resolution. The plurality of video frames may be associated with a frame rate. The frame rate indicates the time domain spacing between each image in the plurality of video frames. Motion data describing motion of the camera 200 is determined by tracking the motion of objects represented by the plurality of video frames. For instance, an analysis that determines that an object in the video frames moves three meters to the left over a time interval can indicate that the camera 200 moves three meters to the right over the same time interval.

In a third embodiment, the camera 200 receives 410 motion data based on an analysis of audio data captured by the one or more microphones 212. The motion data can be determined based on the level of background noise received by one or more microphones 212 over a time interval. For example, the motion data may be background noise levels from each microphone 212 configured on the camera 200. The motion vector may be determined from the motion data by determining the direction or orientation of the microphone 212 that picks up the least background noise.

The camera 200 determines 420 a motion vector based on the received motion data. The motion vector is a vector in the direction of the camera 200 movement. In other words, the motion vector points in the direction of the camera's velocity. The magnitude of the motion vector can be equal to the speed of the camera 200, though in some embodiments not described further herein, the motion vector is merely a direction without a magnitude. In other embodiments, the motion vector may be equal to the speed of the camera but in the opposite direction of the camera's velocity.

In embodiments in which the motion data comprises acceleration data, the camera 200 determines 420 the motion vector by integrating the acceleration data. The motion data, comprising the direction and magnitude of acceleration experienced by the camera 200, is integrated over time to determine the direction and magnitude of the camera's velocity. The camera 200 may integrate the acceleration data in real-time to dynamically determine 420 the camera's velocity from the motion data. The camera 200 determines 410 the motion vector from the camera's velocity. The motion vector is equal in direction and magnitude to the camera's determined velocity.

In embodiments in which the motion data is based on a plurality of video frames, the camera 200 determines 420 the motion vector by determining one or more pixel motion vectors. The pixel motion vector indicates the displacement of a region of pixels between two frames in the plurality of video frames. For example, a pixel motion vector may indicate the position of the region of pixels in a second frame as compared to the position of the same region of pixels in a first frame. The camera 200 determines the pixel motion vector by selecting a region of pixels. The region of pixels may comprise a single pixel, a macroblock of pixels, an outline of an object, a region of similar pixels, an edge at which a discontinuity in the frame occurs, or any other collection of pixels. The camera 200 determines the location of the region of pixels in the first frame. The camera 200 then determines the location of the same region of pixels in a second frame subsequent to the first frame in the plurality of video frames. The camera 200 may determine the location of the same region of pixels in the second frame using a conventional image processing, machine vision, or image analysis algorithm that identifies the region of pixels in each frame. The camera 200 generates a pixel motion vector that spans from the location of the region of pixels in the first frame to the location of the same region of pixels in the second frame. The camera 200 may use a feature-matching algorithm, a pixel-recursive algorithm, a stochastically-determined algorithm, an optical flow algorithm, or any other computer or mathematical algorithm to determine the direction and magnitude of the distance between the different locations of the region of pixels in the two video frames. The pixel motion vector may be a 2-dimensional vector on the frame plane or a 3-dimensional vector that has a vector component normal to the frame plane.

The camera 200 determines 420 the motion vector for the camera 200 based on the one or more determined pixel motion vectors and the frame rate of the plurality of video frames. The camera 200 can determine 420 the motion vector for the camera 200 based on the direction and magnitude of the one or more pixel motion vectors. For example, the pixel motion vector may indicate that the camera 200 has moved the distance of the pixel motion vector during the time interval between the two images. Thus, the motion vector is equal in direction and magnitude to the pixel motion vector. In other embodiments, in which the motion vector is opposite the direction of the camera's motion, the motion vector may be equal in magnitude but opposite in direction to the pixel motion vector.

In embodiment in which the motion data is determined based on an analysis of background noise received by one or more microphones 212 over a time interval, the camera 200 determines 420 the motion vector by determining the level of background noise received by each microphone 212 configured on the camera 200. In one example embodiment, the camera 200 receives a level of background noise from each microphone 212. The level of background noise may be received before or while the camera receives video data. In one example embodiment, the lowest level of background noise is the lowest decibel input into the microphone. In another example embodiment, the lowest level of background noise is the lowest sound intensity within a predetermined frequency range known to be associated with background noise, such as wind noise, interference, or vibrational noise. The camera 200 determines which microphone 212 is associated with the lowest background noise level. The camera 200 determines 420 the motion vector based on the intensity of the background noise levels and the microphone 212 with the lowest background noise level. In one example embodiment, the camera 200 determines that the motion vector is in the direction of the microphone 212 with the lowest background noise level. The magnitude of the motion vector may correspond to or be proportional or inversely proportional to the lowest background noise level. In other embodiments, in which the microphone is opposite the direction of camera motion, the motion vector is in the opposite direction of the microphone 212 with the lowest background noise level.

The camera 200 determines 430 an associated surface vector for each camera surface that includes a microphone 212. In one example embodiment, the surface vector is perpendicular to (or "normal to") each camera surface that includes one or more microphones 212. In another example embodiment, in which the camera surface and surface of the microphone 212 are not parallel, the surface vector may be perpendicular to the surface of the microphone 212 included on the camera surface.

The camera 200 identifies 440 a subset of surface vectors. The angular displacement between each surface vector in the subset of identified surface vectors and the motion vector is less than 90 degrees. Each surface vector with an angular displacement of less than 90 degrees from the motion vector (representative of a direction opposite the direction of motion of the camera 200) generally faces (at least in part) the direction of the camera's movement. In another embodiment, the subset of surface vectors comprises only the surface vector associated with the smallest angular displacement between the surface vector and the motion vector.

The camera 200 selects 450 one or more microphones 212 based on the identified subset of surface vectors. For example, if the subset or surface vectors include two surface vectors, each normal to a camera surface including a microphone, one or both of the microphones 212 on the surfaces normal to the subset of surface vectors are selected. In one embodiment, the camera 200 only selects one microphone 212 associated with the surface vector with the smallest angular displacement between the surface vector and the motion vector. In another embodiment, the camera selects each microphone 212 associated with a surface vector with an angular displacement of less than 90 degrees between the surface vector and the motion vector. However, in other embodiments, the camera 200 selects 450 one or more microphones 212 associated with the surface vector or vectors with the largest angular displacement between the surface vector and the motion vector.

The camera 200 records 460 audio data using the one or more selected microphones 212. The camera 200 activates each selected microphone 212 to record audio data. The camera 200 may record audio data using the selected microphones 212 while concurrently recording video data. The camera 200 can continue to record audio data using the selected microphones 212 for a pre-determined period of time, until a user selects an input associated with stopping the recording of audio/video, or until an above-threshold change in the motion of the camera 200 is detected. When an above-threshold change in the motion of the camera 200 is detected, the camera 200 can select a different set of microphones 212 from which to record audio data. In such a way, the camera 200 can change active microphones 212 in real time based on changes in motion of the camera 200, allowing the camera 200 to record audio data only from microphones best positioned relative to motion of the camera (microphones likely to experience the least wind or static noise).

Figure 5:
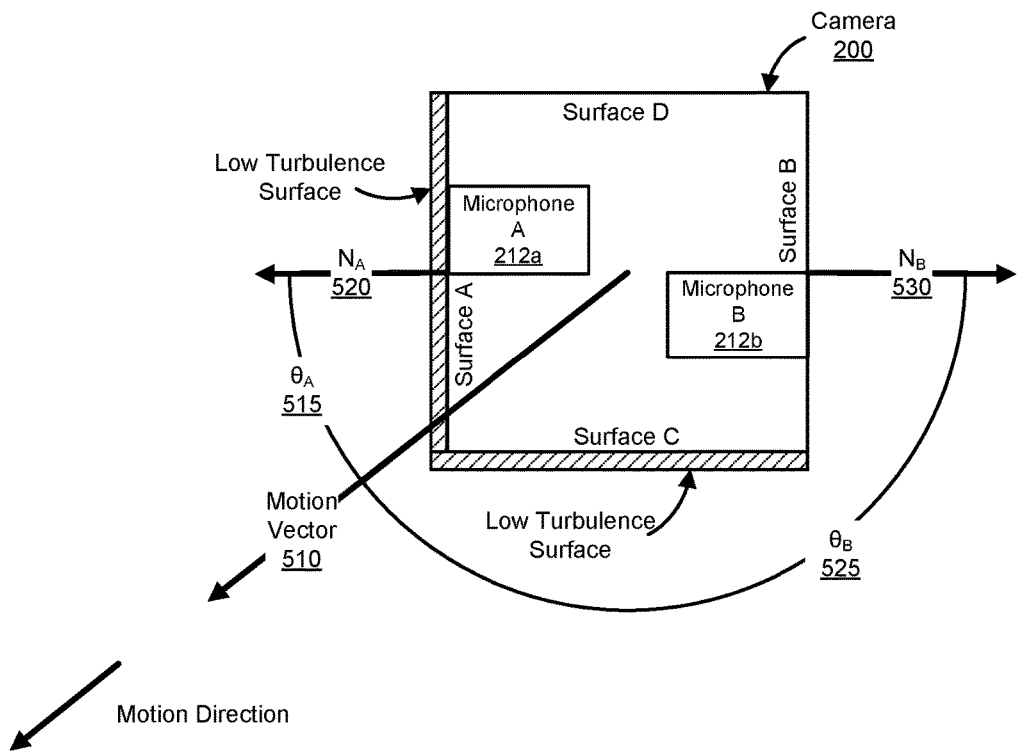
FIG. 5 illustrates a set of vectors used to select a microphone on a dual-microphone camera, according to one embodiment.

FIG. 5 illustrates a set of vectors used to select a microphone on a dual-microphone camera 200, according to one embodiment. The vectors include the motion vector 510 and surface vectors 520 and 530. FIG. 5 also illustrates angular displacements $\theta_A$ 515 and $\theta_B$ 525. While FIG. 5 shows only two microphones 212a and 212b coupled to the camera 200, any number of microphones 212 can be coupled to the camera 200. Furthermore, each of the any number of microphones 212 has an associated surface vector and angular displacement to the motion vector 510.

The illustrated camera 200 has four surfaces: surface A, surface B, surface C, and surface D. Surfaces A and C face the direction of both wind and motion and thus experience lower levels of turbulent pressure fluctuations. Lower levels of turbulent pressure fluctuations (i.e., low turbulence) occur at the leading edge of the camera 200, where air (or fluid) flow has not separated from the camera surface. Since turbulent pressure fluctuations result in wind noise, surfaces A and C are preferable surfaces for a microphone 212.

The angular displacement $\theta_A$ 515 spans the surface vector $N_A$ 520 to the motion vector 510. The motion vector 510 is determined from acceleration data, pixel motion vectors, wind noise levels, or any other suitable motion data. In the illustrated embodiment, the motion vector 510 is parallel to the direction of the camera's motion. Surface vector $N_A$ 520 is normal to the camera surface that includes microphone A 212a. In the illustrated embodiment, $\theta_A$ 515 is less than 90 degrees. In some embodiments, the camera 200 will include the surface vector $N_A$ 520 in the selected subset of surface vectors since $\theta_A$ 515 is less than 90 degrees or because $\theta_A$ 515 is the smallest of all the angular displacements. Since the surface vector is included in the selected subset of surface vectors, the camera 200 can select the microphone A 212a for use to record audio data.

The angular displacement $\theta_B$ 525 spans the surface vector $N_B$ 530 to the motion vector 510. Surface vector $N_B$ 530 is normal to the camera surface that includes microphone B 212b. In the illustrated embodiment, $\theta_B$ 525 is greater than 90 degrees. In some embodiments, since $\theta_B$ 525 is greater than 90 degrees, or because $\theta_B$ 525 is larger than the smaller angular displacement $\theta_A$ 515, the camera 200 will not include the surface vector $N_B$ 530 in the selected subset of surface vectors and will thus not use microphone B 212b to record audio data.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising;
   receiving motion data associated with a camera;
   determining a movement direction of the camera using the motion data;
   selecting one or more of a plurality of microphones of the camera using the movement direction, each selected microphone facing the movement direction; and
   capturing audio data using only the selected one or more plurality of microphones.

2. The method of claim 1, wherein the camera is a waterproof camera.

3. The method of claim 1, wherein the motion data comprises any of acceleration data from an accelerometer of the camera, video data from a plurality of video frames associated with the camera, audio data from the plurality of microphones.

4. The method of claim 1, further comprising:
   for each surface of the camera that includes a microphone of the plurality of microphones, determining a surface vector that is normal to the corresponding surface; and
   determining the movement direction as a motion vector using at least in part a combination of the determined surface vectors.

5. The method of claim 4, wherein determining the movement direction as a motion vector using at least in part a combination of the determined surface vectors comprises:
   identifying a subset of the determined surface vectors, an angular displacement between each identified surface vector in the subset of the determined surface vectors and the motion vector comprising an angle less than 90 degrees; and
   selecting less than all of the plurality of microphones using the subset of the determined surface vectors, the one or more selected microphones located on surfaces associated with surface vectors in the subset of the determined surface vectors.

6. The method of claim 5, wherein selecting less than all of the plurality of microphones using the subset of the determined surface vectors comprises:
   selecting a microphone associated with a surface vector of the subset of the determined surface vectors having a smallest angular displacement from the motion vector.

7. The method of claim 5, wherein selecting less than all of the plurality of microphones using the subset of the determined surface vectors comprises:
   selecting a microphone associated with a surface vector of the subset of the determined surface vectors having a largest angular displacement from the motion vector.

8. The method of claim 1, further comprising:
   in response to determining a change in the movement direction, updating the movement direction;
   selecting another one or more of the plurality of microphones using the updated movement direction, each selected microphone facing the updated movement direction; and
   capturing audio data using the another one or more selected microphones.

9. A camera, comprising:
   a plurality of microphones located on one or more surfaces of the camera; a processor configured to:
   receive motion data associated with a camera,
   determine a movement direction of the camera using the motion data,
   select one or more of the plurality of microphones using the movement direction, each selected microphone facing the movement direction; and
   a microphone controller configured to activate only the selected one or more plurality of microphones to capture audio data.

10. The camera of claim 9, wherein the camera is a waterproof camera.

11. The camera of claim 9, wherein the motion data comprises any of acceleration data from an accelerometer of the camera, video data from a plurality of video frames associated with the camera, audio data from the plurality of microphones.

12. The camera of claim 9, the processor further configured to:
   for each surface of the camera that includes a microphone of the plurality of microphones, determining a surface vector that is normal to the corresponding surface; and
   determining the movement direction as a motion vector using at least in part a combination of the determined surface vectors.

13. The camera of claim 12, wherein to determine the movement direction as a motion vector using at least in part a combination of the determined surface vectors comprises to:
   identify a subset of the determined surface vectors, an angular displacement between each identified surface vector in the subset of the determined surface vectors and the motion vector comprising an angle less than 90 degrees; and
   select less than all of the plurality of microphones using the subset of the determined surface vectors, the one or more selected microphones located on surfaces associated with surface vectors in the subset of the determined surface vectors.

14. The camera of claim 13, wherein to select less than all of the plurality of microphones using the subset of the determined surface vectors comprises to:
select a microphone associated with a surface vector of the subset of the determined surface vectors having a smallest angular displacement from the motion vector.

15. The camera of claim 13, wherein to select less than all of the plurality of microphones using the subset of the determined surface vectors comprises to:
select a microphone associated with a surface vector of the subset of the determined surface vectors having a largest angular displacement from the motion vector.

16. The camera of claim 9, the processor further configured to:
in response to determining a change in the movement direction, update the movement direction;
select another one or more of the plurality of microphones using the updated movement direction, each selected microphone facing the updated movement direction; and
capture audio data using the another one or more selected microphones.

17. A method for activating at least one of a plurality of microphones configured within a waterproof camera, comprising;
receiving motion data associated with the waterproof camera;
determining a movement direction of the waterproof camera using the motion data;
selecting one or more of the plurality of microphones of the waterproof camera using the movement direction, each selected microphone facing the movement direction; and
capturing audio data using only the selected one or more plurality of microphones.

18. The method of claim 17, wherein the motion data comprises any of acceleration data from an accelerometer of the waterproof camera, video data from a plurality of video frames associated with the waterproof camera, audio data from the plurality of microphones.

19. The method of claim 17, wherein the one or more selected microphones have a below-threshold amount of noise.

20. The method of claim 17, further comprising:
determining a change in the movement direction; and
deactivating at least one of the one or more selected microphones using the change in the movement direction.

* * * * *